United States Patent
Zhao et al.

(10) Patent No.: US 10,182,011 B2
(45) Date of Patent: Jan. 15, 2019

(54) SYSTEM AND METHOD TO ANALYZE CONGESTION IN LOW LATENCY NETWORK

(71) Applicant: Cisco Technology, Inc., San Jose, CA (US)

(72) Inventors: Haoxiang Zhao, Cupertino, CA (US); Chih-Tsung Huang, Burlingame, CA (US); Wei-Jen Huang, Burlingame, CA (US); Vuong Tran, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 122 days.

(21) Appl. No.: 15/444,508

(22) Filed: Feb. 28, 2017

(65) Prior Publication Data

US 2017/0171080 A1   Jun. 15, 2017

Related U.S. Application Data

(62) Division of application No. 14/571,493, filed on Dec. 16, 2014, now Pat. No. 9,614,766.

(51) Int. Cl.
*H04L 12/26* (2006.01)
*H04L 12/801* (2013.01)
*H04L 12/851* (2013.01)
*H04L 12/841* (2013.01)

(52) U.S. Cl.
CPC ............ *H04L 47/11* (2013.01); *H04L 43/028* (2013.01); *H04L 43/04* (2013.01); *H04L 43/062* (2013.01); *H04L 43/0852* (2013.01); *H04L 43/0894* (2013.01); *H04L 43/12* (2013.01); *H04L 47/245* (2013.01); *H04L 47/28* (2013.01)

(58) Field of Classification Search
CPC ....... H04L 47/11; H04L 47/28; H04L 47/245; H04L 43/0894; H04L 43/0852; H04L 43/04; H04L 43/12; H04L 43/062; H04L 43/028
USPC .............................. 370/229–238.1, 252–253
See application file for complete search history.

(56) References Cited

U.S. PATENT DOCUMENTS

| | | | |
|---|---|---|---|
| 6,021,116 A * | 2/2000 | Chiussi | H04L 12/5602 370/236 |
| 9,614,766 B2 | 4/2017 | Zhao et al. | |
| 2003/0161270 A1* | 8/2003 | Valvo | H04J 3/0682 370/236.1 |
| 2005/0058149 A1 | 3/2005 | Howe | |
| 2005/0083837 A1 | 4/2005 | Maehara et al. | |
| 2005/0286416 A1* | 12/2005 | Shimonishi | H04L 1/1671 370/229 |
| 2006/0176808 A1* | 8/2006 | Isobe | H04L 47/10 370/229 |
| 2009/0016366 A1 | 1/2009 | Endo et al. | |
| 2012/0269062 A1 | 10/2012 | Cho | |
| 2013/0142066 A1 | 6/2013 | Yamaguchi et al. | |

(Continued)

*Primary Examiner* — Thai D Hoang
(74) *Attorney, Agent, or Firm* — Merchant & Gould P.C.

(57) ABSTRACT

Intelligent packet analysis may be provided to determine congestion problems and lead to fast solutions in low latency networks. Specifically, a congestion analyzer system may allow a user to monitor congestion on a network while using lightweight storage. A sniffer tool may be employed to capture all packets and store associated packet information into a database.

17 Claims, 11 Drawing Sheets

(56) References Cited

U.S. PATENT DOCUMENTS

| | | | |
|---|---|---|---|
| 2013/0205037 A1* | 8/2013 | Biswas | H04L 47/365 709/232 |
| 2014/0016461 A1* | 1/2014 | Ishikawa | H04L 47/17 370/230 |
| 2014/0254357 A1* | 9/2014 | Agarwal | H04L 47/12 370/229 |
| 2015/0078171 A1* | 3/2015 | Gai | H04W 4/70 370/237 |
| 2015/0117195 A1* | 4/2015 | Toy | H04L 47/263 370/232 |
| 2015/0131538 A1* | 5/2015 | Ben-Nun | H04W 72/1231 370/329 |
| 2016/0173354 A1 | 6/2016 | Zhao et al. | |

* cited by examiner

Latency Report Page

| Total |
|---|
| 10 |

Latency Report

| ID | Latency (ns) | Length (byte) | Time (us) | Type | Ingress Port | Egress Port | SA | DA | L₄ SRC Port | L₄ DST Port |
|---|---|---|---|---|---|---|---|---|---|---|
| 1 | 1761 | 1275 | 1578783944 | Ethernet | 3 | 5 | 0-0-0-0-0-4 | 0-0-0-0-0-6 | 0 | 1 |
| 2 | 867 | 1204 | 1578783495 | Ethernet | 4 | 5 | 0-0-0-0-0-5 | 0-0-0-0-0-6 | 0 | 1 |
| 3 | 867 | 1204 | 1578783520 | Ethernet | 4 | 5 | 0-0-0-0-0-5 | 0-0-0-0-0-6 | 0 | 1 |
| 4 | 251 | 1138 | 1578783675 | Ethernet | 3 | 5 | 0-0-0-0-0-4 | 0-0-0-0-0-6 | 0 | 1 |
| 5 | 191 | 1504 | 1578811032 | Ethernet | 2 | 5 | 0-0-0-0-0-3 | 0-0-0-0-0-6 | 0 | 1 |
| 6 | 191 | 1504 | 1578762399 | Ethernet | 2 | 5 | 0-0-0-0-0-3 | 0-0-0-0-0-6 | 0 | 1 |
| 7 | 191 | 1504 | 1578774557 | Ethernet | 2 | 5 | 0-0-0-0-0-3 | 0-0-0-0-0-6 | 0 | 1 |
| 8 | 191 | 1504 | 1578823190 | Ethernet | 2 | 5 | 0-0-0-0-0-3 | 0-0-0-0-0-6 | 0 | 1 |
| 9 | 190 | 1504 | 1578798874 | Ethernet | 2 | 5 | 0-0-0-0-0-3 | 0-0-0-0-0-6 | 0 | 1 |
| 10 | 189 | 1204 | 1578783586 | Ethernet | 4 | 5 | 0-0-0-0-0-5 | 0-0-0-0-0-6 | 0 | 1 |

SYSTEM AND METHOD TO ANALYZE CONGESTION IN LOW LATENCY NETWORK

RELATED APPLICATION

This application is a Division of U.S. application Ser. No. 14/571,493 entitled "System and Method to Analyze Congestion in Low Latency Network" filed Dec. 16, 2014, now U.S. Pat. No. 9,614,766, which is incorporated herein by reference.

TECHNICAL FIELD

The present disclosure relates generally to network troubleshooting, specifically, congestion analysis in low latency networks.

BACKGROUND

In an ideal setup low latency may allow human-unnoticeable delays between an input being processed and the corresponding output providing real-time or near real-time characteristics. This can be especially important for trading services. In capital markets algorithmic trading may be used to process market updates and turn around orders within milliseconds. Trading using computers has developed to the point where millisecond improvements in network speeds offer a competitive advantage for financial institutions.

As such, congestion can be a serious issue, and there is a need to quickly determine when and why such congestion may occur. In some prior attempted solutions, a user may be able to attach a device to a network port and receive a packet dump. However, many networks operate with a traffic rate of nearly 10 Gbps. Such a traffic rate may lead to 1.25 GB of data created every second. A single day's traffic then requires 108 TB of storage. This approach wastes huge amounts of storage space and leads to unwieldy query times due to the amount of data.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Methods and system are disclosed which can provide intelligent packet analysis to determine congestion problems and lead to fast solutions in low latency networks. Specifically, a congestion analyzer system may allow a user to monitor congestion on a network while using lightweight storage. A sniffer tool may be employed to capture all packets and store associated packet information into a database.

Both the foregoing overview and the following example embodiment are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiment.

EXAMPLE EMBODIMENTS

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Embodiments of the present disclosure provide for a packet information database to store packet information captured by a sniffer tool. The packet information database may have three defined tables. A first table, which may be referred to throughout this document as a "flow table", may contain the following values: 1) a flow record ID value to uniquely identify the associated network flow; 2) a packet type identifier to identify the type of packets being transmitted on the associated network flow (i.e., L2, L3, etc); 3) a source address represented by the MAC address or IP address associated with the packet type; 4) a destination address represented by the MAC address or IP address associated with the packet type; 5) a source port (such as an L4 source port); and 6) a destination port (such as an L4 destination port).

Along with the flow table, the database may comprise a second table, which may be referred to throughout this document as a "congestion table". The congestion table may contain the following values: 1) a congestion record ID value to uniquely identify the associated congestion record; 2) a congestion start time value to identify the start time of detected congestion; and 3) a congestion end time value to identify the end time of detected congestion.

The database may further comprise a third table, which may be referred to throughout this document as a "packet table". The packet table may contain the following values: 1) a flow ID value to uniquely identify the associated data flow; 2) a packet length value indicating the length of the associated packet; 3) an arrival time value corresponding to the arrival time of the associated packet; 4) and a latency value corresponding to the amount of time the packet stays at a particular location (such as during processing at a particular processor).

Embodiments of the present disclosure employ the above described database to analyze congestion in a low latency network. A network device may operate a packet sniffer tool for extracting information relevant for storage in the disclosed database. Normally, a network device may only look at packets addressed to it and may ignore the rest of the traffic on the network. But when a packet sniffer is set up on a network device, the sniffer's network interface is set to look at everything that comes through. The amount of traffic largely depends on the location of the computer in the network. A client system out on an isolated branch of the network sees only a small segment of the network traffic, while the main domain server sees almost all of it. Thus, selection of a device to operate a packet sniffer may be made accordingly to capture all of the traffic desired to be monitored. In embodiments of the present disclosure, the packet sniffer may extract packet information including, but not limited to, packet size, arrival time, departure time, source address, destination address, packet type, source port number, and destination port number.

The sniffer tool may operate to calculate a latency value for each packet. This calculated latency value may be compared to a user-defined congestion threshold value. The threshold value may be determined based on the acceptable levels of latency for applications running on the network. The lower latency required may lead to a lower defined congestion threshold level.

If it is determined that the calculated latency value is less than the user-defined threshold value, the congestion table is subsequently searched for the most recent congestion record. Once the most-recent congestion record is located, it may be determined whether the associated congestion end time value in the record has a NULL value. If the congestion end time value is a NULL value, the congestion table record may be updated by using the packet arrival time value as the new congestion end time value. If the congestion end time value is not a NULL value, the congestion record may stay unchanged.

If it is determined that the calculated latency value is greater than the user-defined threshold value, a new flow record may be created for addition to the database. The existing flow table may first be searched to determine whether a flow record already exists for the detected flow. If so, the newly created flow record may be discarded. If the flow record is a new record then it may be inserted into the flow table.

Next, the congestion table may be searched for the most recent congestion record. Once the most-recent congestion record is located, it may be determined whether the associated congestion end time value in the record has a NULL value. If the congestion end time value is a NULL value, the congestion record may stay unchanged. If the congestion end time value is not a NULL value, a new congestion record may be created. The new congestion record may use the packet arrival time as the congestion start time value. Furthermore, the new congestion record may leave the congestion end time value as NULL.

A packet record may then be created for the packet table. The packet record may contain the flow record ID value, the packet length, the packet arrival time, and the packet latency. Once the packet table is updated, embodiments of the present disclosure may continue sniffing to capture the next packet.

In some embodiments, the sniffer tool acts to capture packets, parse packet information, and save associated information in the packet table. The sniffer tool may not be able to perform these operations at a speed equal to that of the incoming traffic. In such an instance it may be desired to increase the efficiency of packet storage to avoid unnecessary packet loss.

To increase capturing efficiency, a user may be allowed to define the number of workers (network devices) required to parse a packet. Each of the workers may comprise a dedicated buffer for use in a two-phase approach by the sniffer tool. In the first phase, incoming packets may be hashed to one of the plurality of available workers and subsequently stored in the selected worker's associated dedicated buffer. In the second phase, each of the workers may parse its dedicated buffer and store the desired information into the packet information database.

Once the desired information is stored into the packet information database, a monitor tool may be employed to analyze the perceived congestion. In some embodiments, the monitor tool may first check the congestion table. Each time that the monitoring tool finds a new congestion record it may retrieve congestion record ID value. The monitor tool may then use the congestion record ID value to determine what type of traffic was being transmitted during the congestion period.

The traffic may be identified by traffic type, traffic rate, and a traffic time. The monitor tool may use this information to generate a report that is subsequently transmitted to a requesting user. In some embodiments of the present disclosure, the monitor tool may be responsible for setting the latency threshold. Furthermore, the monitoring tool may periodically poll the congestion table to locate new congestion records. When heavy congestion is detected the monitoring tool may then automatically send reports to users, such as network administrators.

Figure 1:
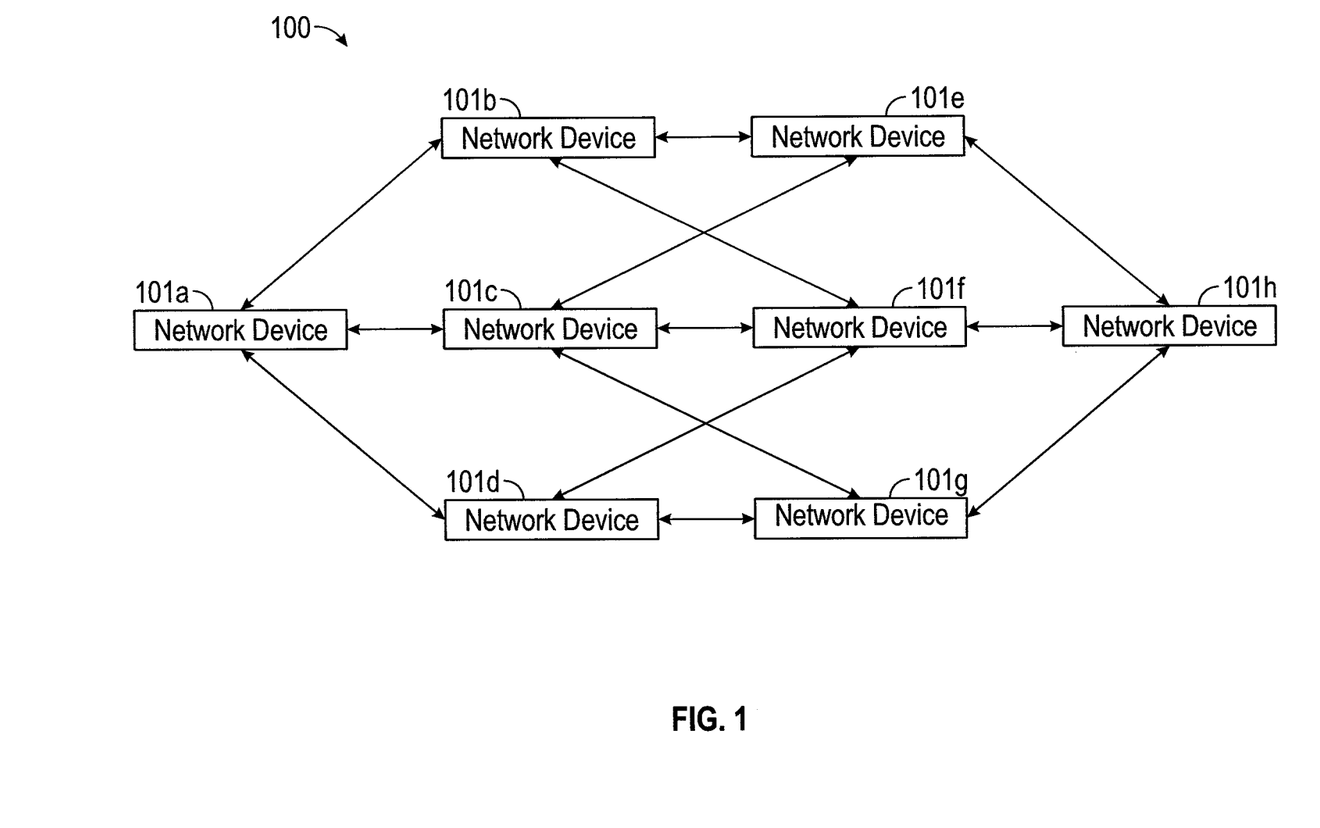
FIG. 1 illustrates a sample network topology where embodiments of the present disclosure may be performed.

FIG. 1 illustrates a sample network topology that will be used in the following description to illustrate embodiments of the present disclosure. The described network topology may exist in a networking environment 100. While networking environment 100 is depicted as a wired network environment, a wireless network environment is also consistent with embodiments of the disclosure. For example, networking environment 100 may be any type of system that transmits data packets over a network. As an example, networking environment 100 may be an environment enabled to provide voice communications, and video and data services.

Networking environment 100 may be based on a bi-directional transfer of packet based service, such as Internet Protocol (IP) traffic, between any number of network devices. Networking environment 100 may further include a plurality of gateways (not shown), for example, but not limited to cable modems, routers, switches, set top boxes, and computers. Networking environment 100 may include any combination of wide area networks (WANs), local area networks (LANs), or wireless networks suitable for packet-type communications, such as Internet communications.

Networking environment 100 may be designed to transmit a stream of data packets from network device 101a to network device 101h. Networking environment 100 may comprise a number of network devices 101a-h. Network devices 101a-h may be routers, bridges, or other network devices capable of receiving and transmitting a data stream (including PTC packets) from a source network device (here, 101a) to a destination network device (here, 101h). Specifically, in embodiments of the present disclosure any of the described network devices may operate the disclosed congestion analyzer system, operate a sniffer tool, operate a monitor tool, and contain one or more dedicated buffers. Network devices generally are discussed in further detail in regards to FIG. 2.

Figure 2:
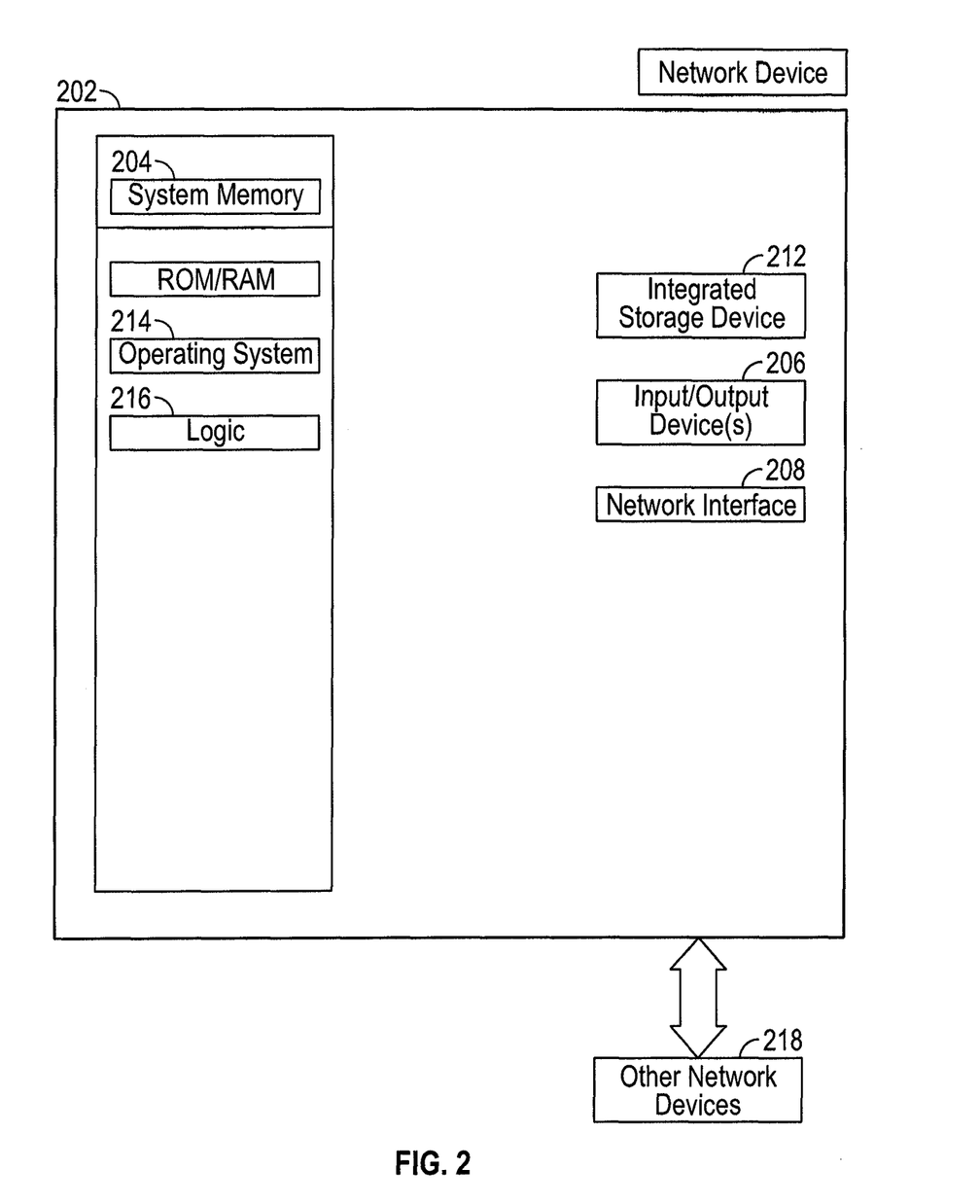
FIG. 2 shows a network device in greater detail.

FIG. 2 shows a network device (such as network devices 101a-h) in greater detail. A network device may include a processing device 202, a memory 204, input/output (I/O) devices 206, and a network interface 208, each of which is communicatively coupled via a local interface (not shown). Processing device 202 may be a hardware device for executing software, particularly that which is stored in memory 204. Processing device 202 may be any custom made or commercially available processor, a central processing unit (CPU), an auxiliary processor among several processors, a semiconductor-based microprocessor (in the form of a microchip or chip set), a microprocessor, or generally any device for executing software instructions. Software executed by processing device 202 may include software at least capable of operating disclosed monitoring tools and disclosed sniffer tools.

Network interface 208 may include one or more devices that communicate both inputs and outputs, for instance but not limited to, a modulator/demodulator (modem for accessing another device, system, or network), a radio frequency (RF) transceiver or other type of transceiver, a telephonic interface, a bridge, a router, etc.

I/O devices 206 may include input devices, for example but not limited to, a keyboard, mouse, scanner, microphone, etc. Furthermore, the I/O devices 206 may also include output devices, for example but not limited to, a printer, display, etc.

The local interface may be, for example but not limited to, one or more buses or other wired or wireless connections. The local interface may have additional elements, which are omitted for simplicity, such as controllers, buffers (caches), drivers, repeaters, and receivers, to enable communications. Further, local interface 210 may include address, control, and/or data connections to enable appropriate communications among the aforementioned components and provides the interface to communicate with a network controller (not shown) or a TOD (such as network device 101a.

In some embodiments, a network device may further be configured with an integrated storage device 212 coupled to local interface 210. Storage device 212 may be configured to buffer a plurality of data packets. One or more such buffers may be dedicated buffers for storing captured packets. In some embodiments, storage device 212 may be externally coupled to a content server (not shown).

Memory 204 may include a suitable operating system (O/S) 214. Operating system 214 essentially may control the execution of other computer programs, such as scheduling, input-output control, file and data management, memory management, and communication control and related services. Logic 216 may include executable code to send service requests to the network controller or TOD.

Memory 204 may include any one or combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory 204 may incorporate electronic, magnetic, optical, semi-conductive, and/or other types of storage media. Note that memory 204 may have a distributed architecture, where various components are situated remotely from one another, which can be accessed by the processing device 202.

The software in memory 204 may include one or more separate programs, each of which comprises an ordered listing of executable instructions for implementing logical functions. In the embodiment shown in FIG. 2, the software in memory 204 may include operating system 214 and logic 216, as explained above. Functionality of logic 216 may be implemented using a single module, or distributed among a plurality of modules.

When logic 216 is in operation, processing device 202 may be configured to execute logic 216 stored within memory 204, to communicate data to and from memory 204, and to generally control operations of logic 216. Logic 216 and O/S 214, in whole or in part, but typically the latter, are read by processing device 202, perhaps buffered within processing device 202, and then executed.

The network controller may include a communication interface suitable for enabling communication (e.g., TCP/IP) of data packets with other network devices 218 of network environment 100 For instance, communication interface may be of a type suitable for communication over an IP network, a coaxial cable network, an HFC network, and/or wireless network, among others.

In some embodiments, a server (such as network device 101b) may be connected to a switch port in order to collect packets. A sniffer tool may run on the processor in the server such that the server may parse the collected packets and store relevant information in a packet information database. This database may be located either on the server or on a remote network device.

Figure 3:
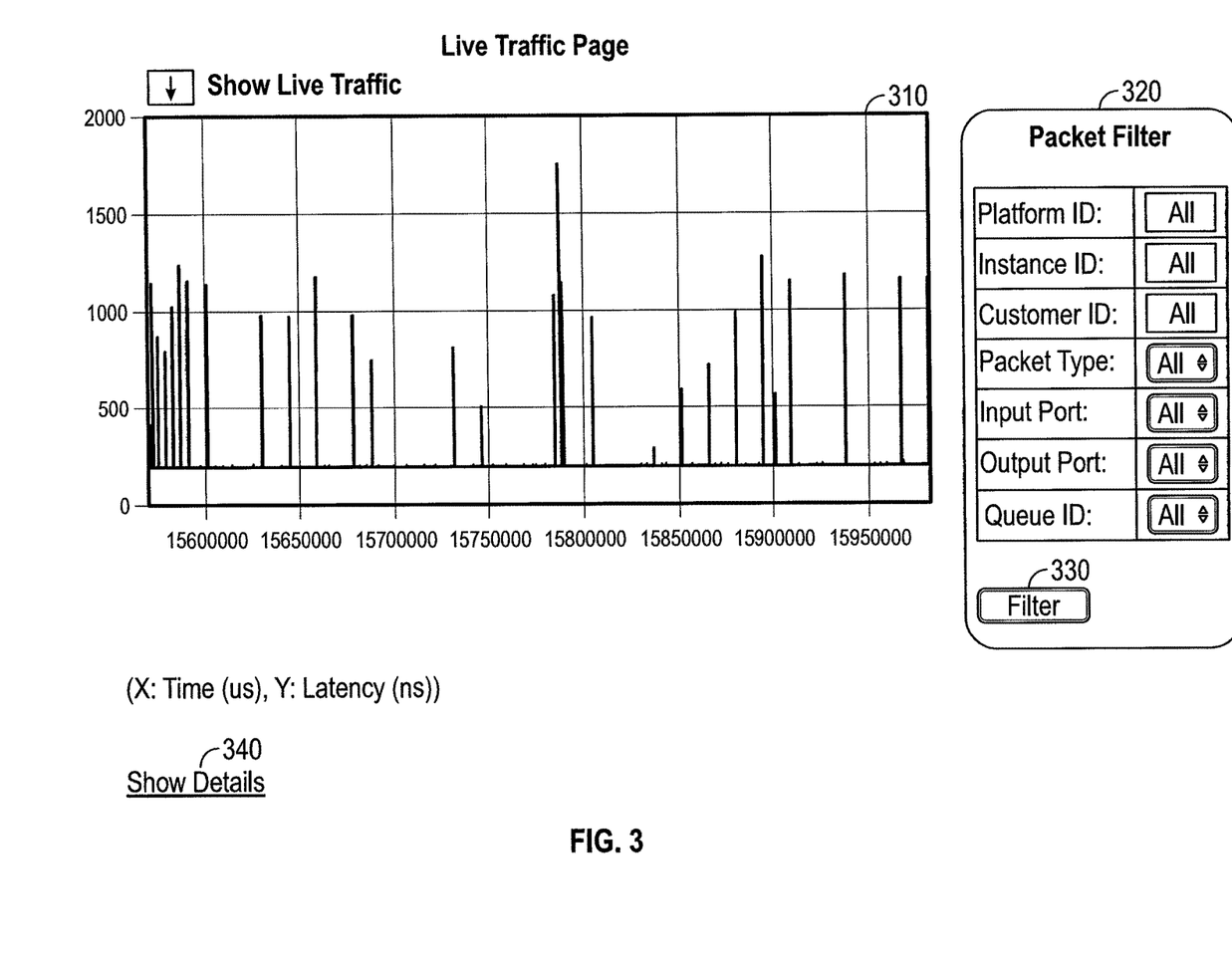
FIG. 3 shows a graphical representation of live traffic statistics according to embodiments of the present disclosure.

A frontend device may further be connected to the network environment. The frontend device may operate a user interface to view collected traffic details. The user interface may be provided through a browser interface. The user may be required to log into the packet information database to access the traffic data. For example, in some embodiments, a user may be directed to a "live traffic page" as illustrated in FIG. 3. A graphical representation 310 of live traffic statistics may be presented. The x-axis of graphical representation 310 may represent time, while the y-axis may represent the switch latency at that time.

The "live traffic page" may also present a user selectable filter 320, such that traffic statistics are only displayed for a user-selected subset of all traffic. User selectable filter 320 allows a user to filter information for a particular platform, a particular instance, or a particular customer identifier. Additionally, user selectable filter 320 may allow filtering based on a packet type, an input port, an output port, and a queue identifier. It should be understood that single filters or combinations of filters may be employed with embodiments of the present disclosure. Upon user selection of desired filters in user selectable filter 320 a "filter" button 330 may be selected by the user to implement the desired filters.

In some embodiments, the "live traffic page" may further include a selectable link (or button) 340. The selectable link (here, identified as "show details") may be selected by the user. Upon selection the user interface may move to "analyze traffic page" as illustrated in further detail in FIG. 4.

Figure 4:
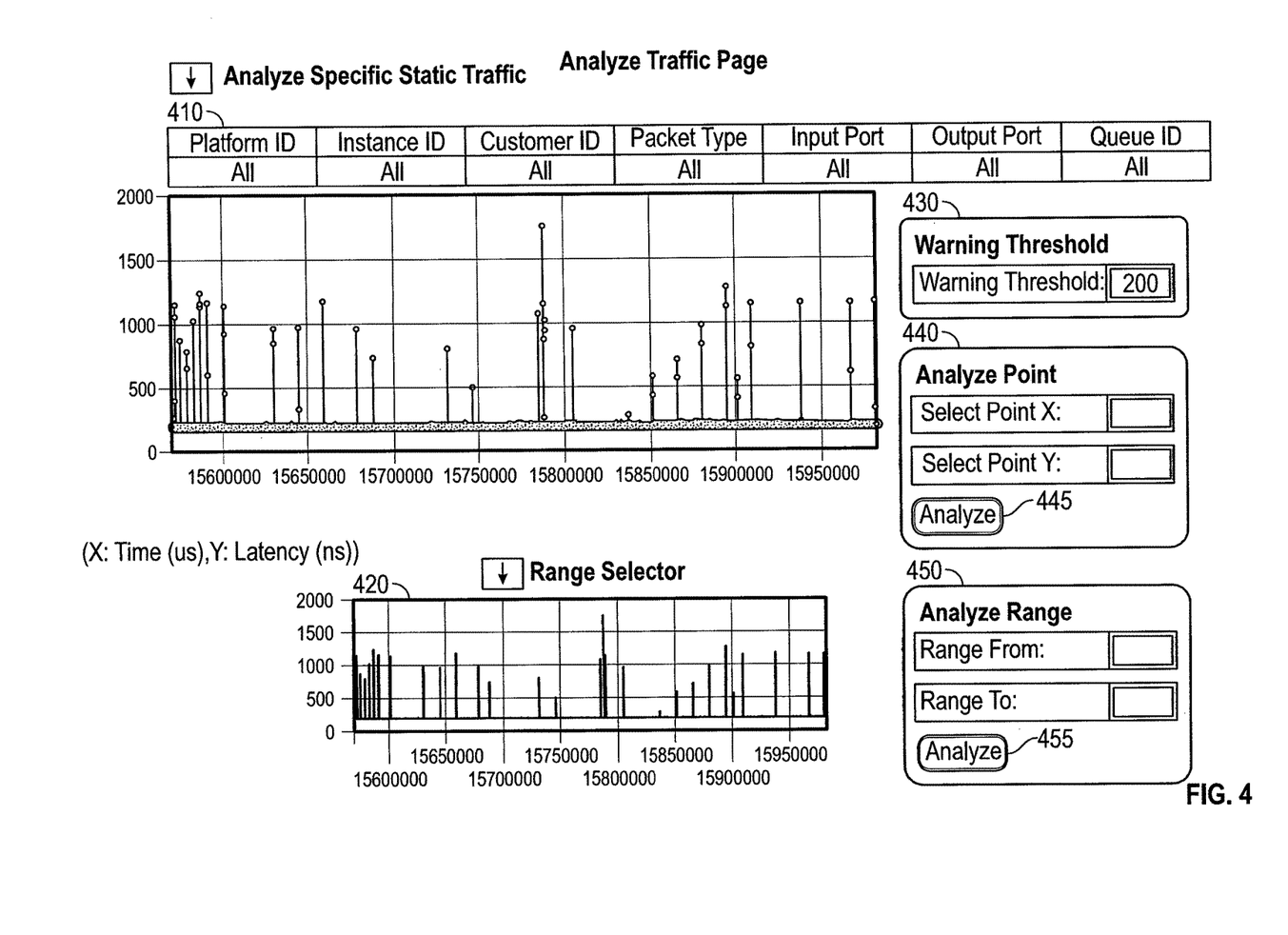
FIG. 4 shows a graphical representation of live traffic analysis according to embodiments of the present disclosure.

The "analyze traffic page" provides a number of informational display windows and user input areas. For example, informational display window 410 provides a more detailed look at specific traffic as filtered by user selection. Informational display window 410 may use differing colors to indicate whether congestion occurs or not at a particular time. For example, point 412 may be colored red to indicate that congestion is occurring at that time. Likewise, a green color may indicate acceptable traffic, such as at point 414. Informational display window 410 may further indicate which filters are currently active for the traffic information. A range selector 420 may be further provided in the "analyze traffic page" to allow a user to zoom in or zoom out to a particular range within the filtered data.

The threshold level itself may be set by a user on this page. For example, a warning threshold user input area 430 may be presented. Warning threshold user input area 430 may allow a user to enter a value to be applied as the latency threshold.

A analyze point user input area 440 may also be presented to a user to narrow down traffic data to a more specific level. For example, a user may select a particular point in the graphical interface by entering associated x and y point values. Once the point values are entered the user may select an "analyze" button 445. Selection of "analyze button" 445 may effectuate the user interface to display an "analyze point page".

Figure 5:
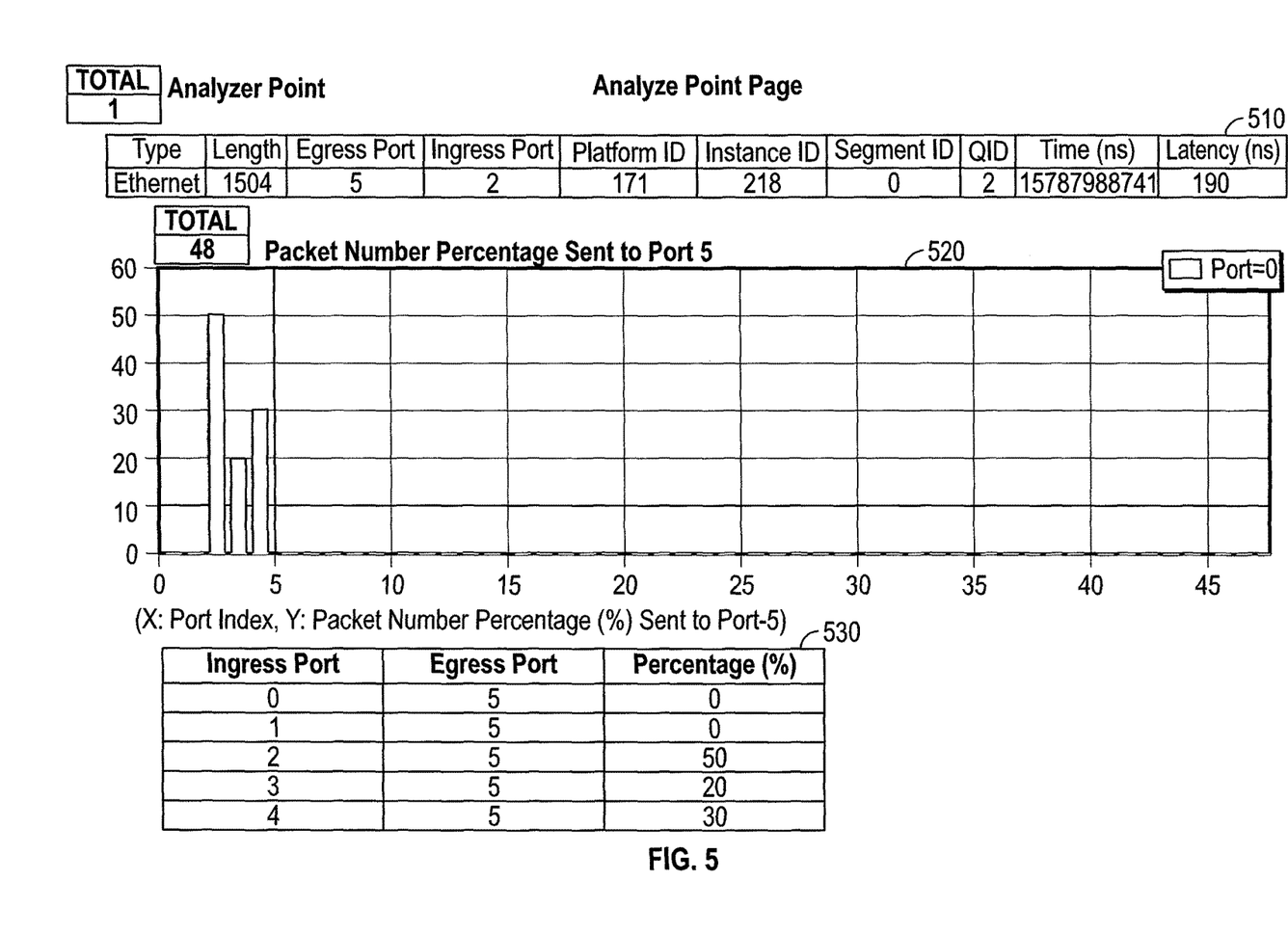
FIG. 5 shows a graphical representation of live traffic analysis according to embodiments of the present disclosure.

FIG. 5 illustrates an "analyze point page" for a user selected data point. When a user selects a time point where congestion occurs, information becomes available as to the destination port that is meeting the congestion (in this case, port 5). Analyzer point information 510 provides specific data for the selected x, y point. For example, in the illustration information for the analyzed point may include packet type, packet length, egress port number, ingress port number, platform identification value, instance identification value, segment identification value, queue identification value, packet time (x-axis value), and packet latency (y-axis value).

The "analyze point page" may further provide a graphical display 520 which illustrates the packet number percentage sent to a particular port (in this case, port 5). The x-axis in graphical display 520 may represent ingress port index numbers. The y-axis in graphical display 520 may represent the percentage of packets being sent from the associated ingress port index to port 5. Finally, the "analyze point page" may present the data from graphical display 520 in a chart form 530.

Returning to FIG. 4, an analyze range user input area 450 may also be presented to a user to narrow down traffic data to a more specific range of points. For example, a user may select a particular beginning and end point in the graphical interface by entering associated point values. Once the point values are entered the user may select an "analyze" button 455. Selection of "analyze button" 455 may effectuate the user interface to display an "analyze point page".

Figure 6:
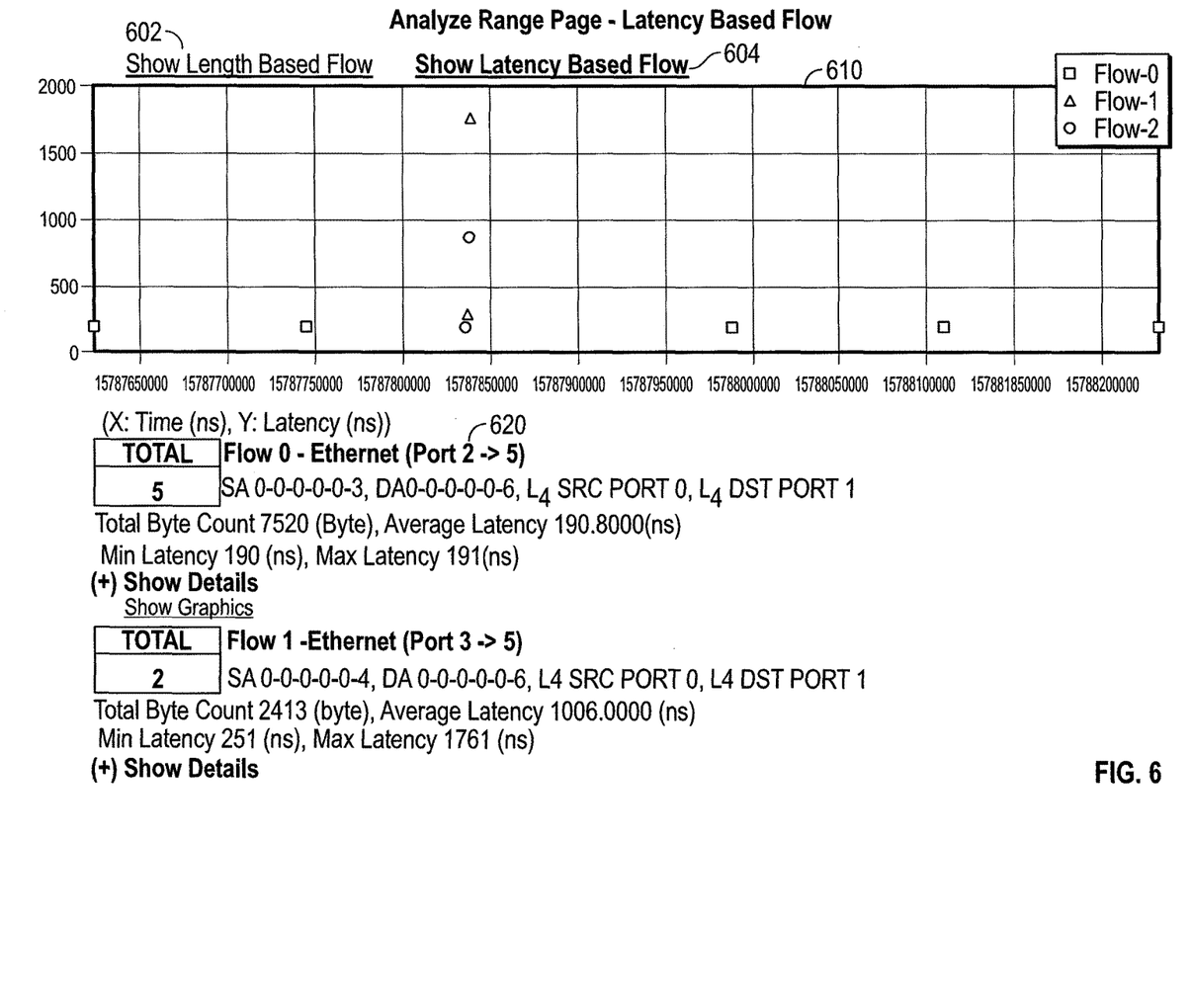
FIG. 6 shows a graphical representation of live traffic analysis according to embodiments of the present disclosure.
Figure 7:
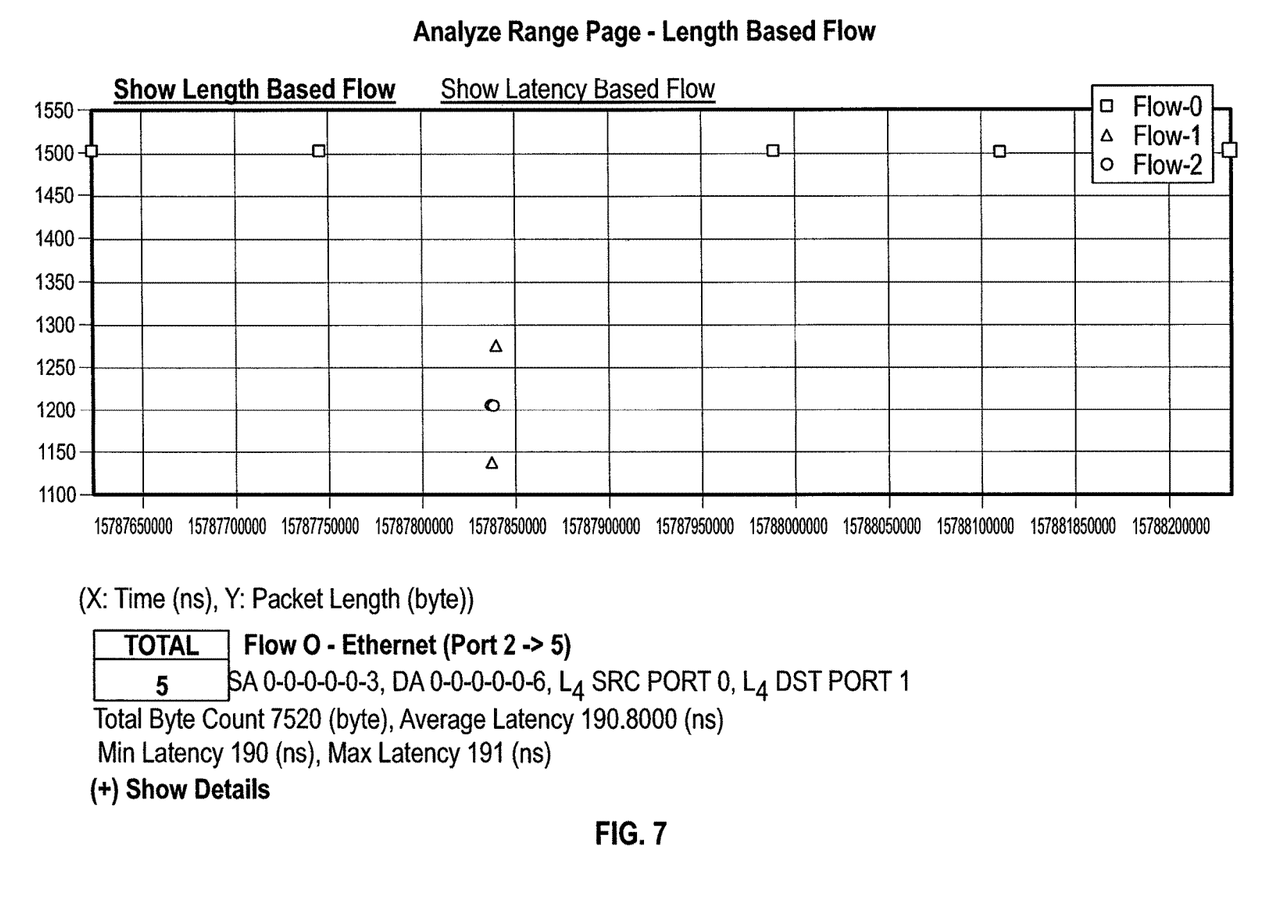
FIG. 7 shows a graphical representation of live traffic analysis according to embodiments of the present disclosure.

FIG. 6 illustrates an "analyze range page" for a user selected data point. Specifically, FIG. 6 illustrates the "analyze range page" in a mode to illustrate latency-based flow information. A user may be presented selectable links 602 and 604 to allow navigation between the "analyze range page" in a mode to illustrate latency-based flow information and an "analyze range page" in a mode to illustrate length-based flow information as shown in more detail with regards to FIG. 7.

For the "analyze range page" in a mode to illustrate latency-based flow information, a graphical display 610 may be provided showing what traffic is in a switch at a selected time. Graphical display 610 may plot points associated with a plurality of flows on a chart where the x-axis may represent time, while the y-axis may represent the switch latency at that time. Different flows may be indicated by different colors representing each flow in graphical display 610.

Section 620 may provide more detailed information regarding each flow. For example, flow 0 may be identified as having 5 points plotted in graphical display 610. Similarly, flow 1 may be identified as having 2 points plotted in graphical display 610. Information regarding the flows may include source address, destination address, source port, destination port, total byte count, average latency, minimum latency, and maximum latency. The level of displayed information may be expanded and contracted based on what information the user desires to view.

Figure 8:
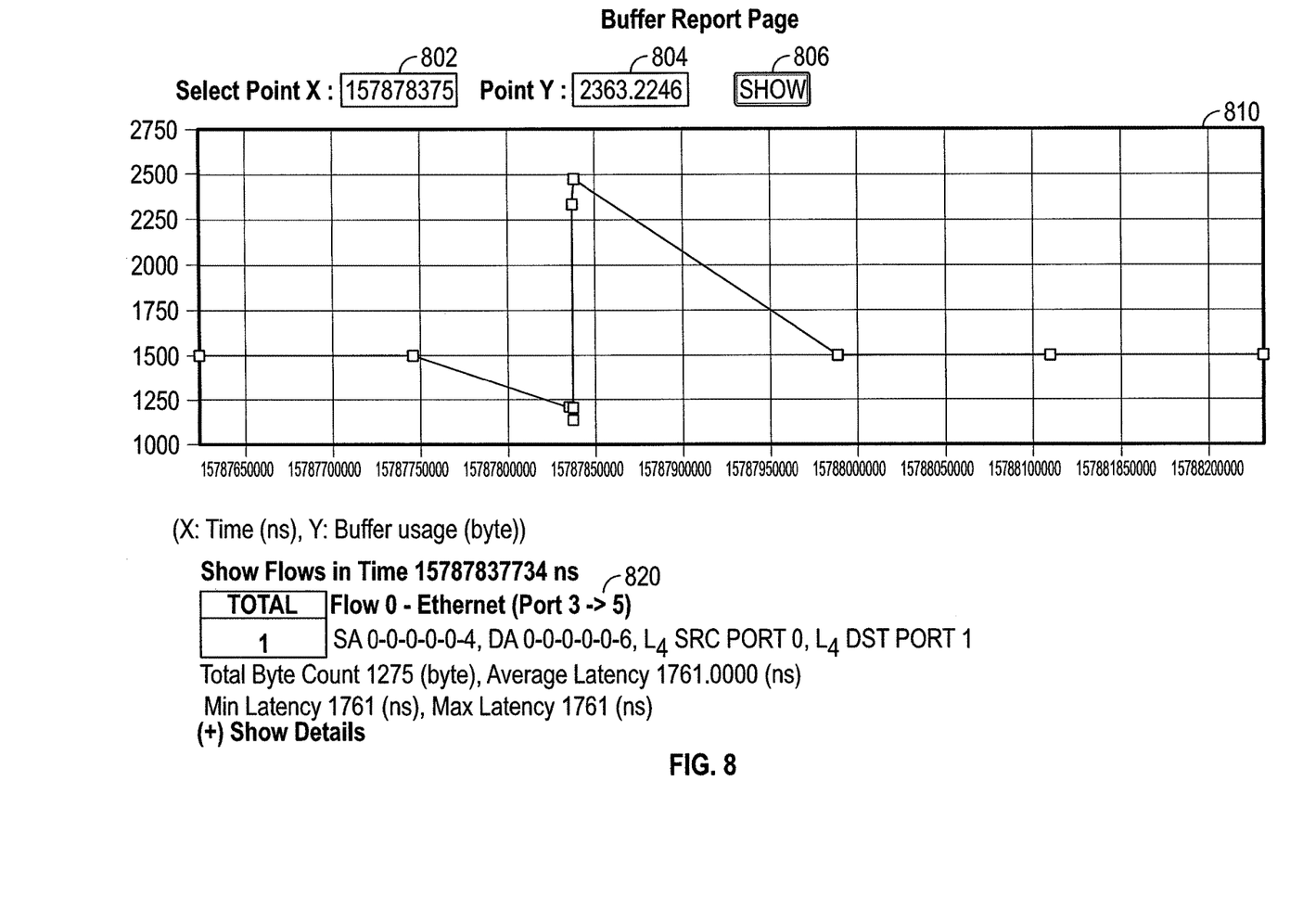
FIG. 8 shows a graphical representation of buffer analysis according to embodiments of the present disclosure.

Embodiments of the present disclosure further provide a "buffer report page" to assist with showing what kind of packet is in the switch's dedicated buffer when congestion occurs. FIG. 8 illustrates a "buffer report page" according to embodiments of the present disclosure. User inputs 802 and 804 may allow for a user to input a specific time and/or buffer usage amount. The user input may further be provided by selecting a point on graphical display 810. The user may then select a "show" button 806. Selection of "show" button 806 may result in the display of section 820. Section 820 may provide information regarding the flows present in the switch buffer at the selected point in time. The information may include source address, destination address, source port, destination port, total byte count, average latency, minimum latency, and maximum latency. The level of displayed information again may be expanded and contracted based on what information the user desires to view.

Figure 9:
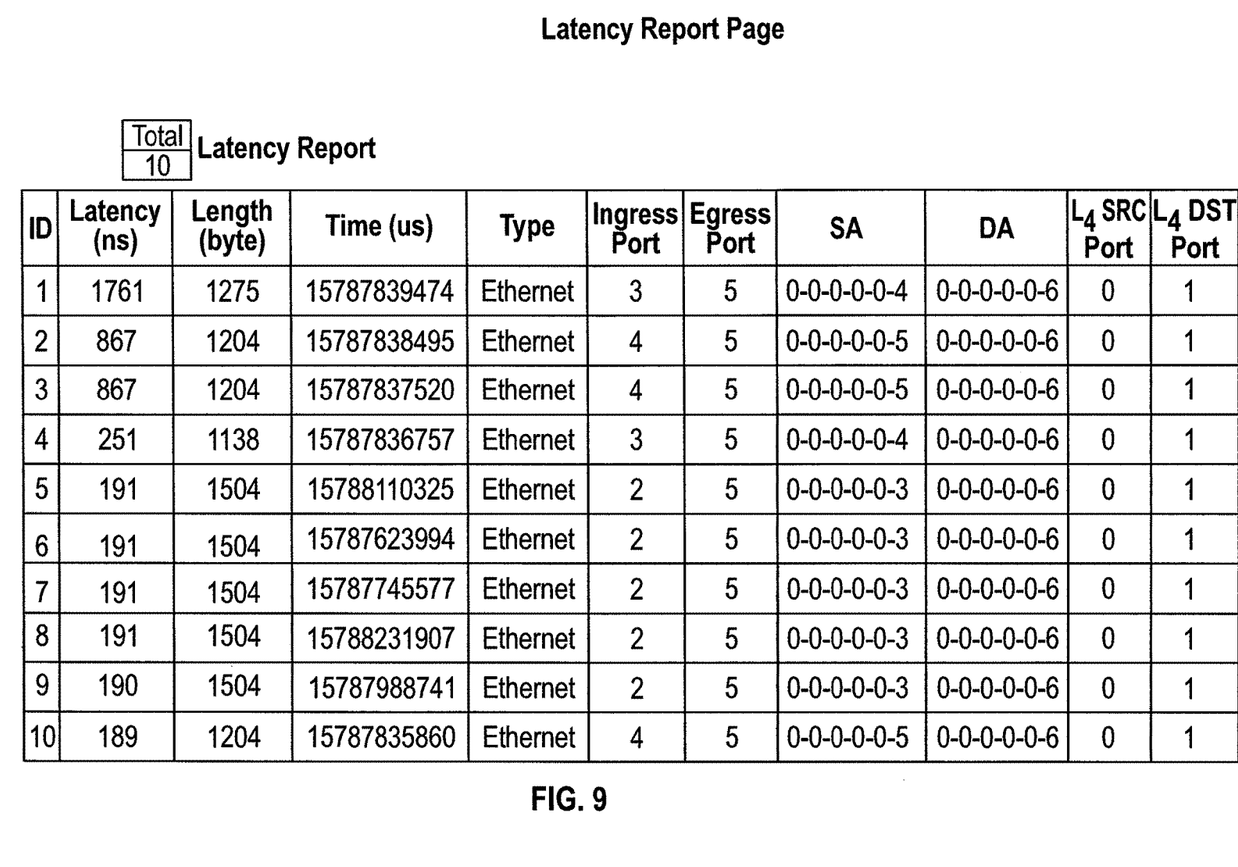
FIG. 9 shows a graphical representation of latency statistics according to embodiments of the present disclosure.

Embodiments of the present disclosure also allow for the user interface to provide a "latency report page" as illustrated in FIG. 9. The "latency report page" may display in a chart format each packet and its associated latency for a selected congestion time.

Figure 10:
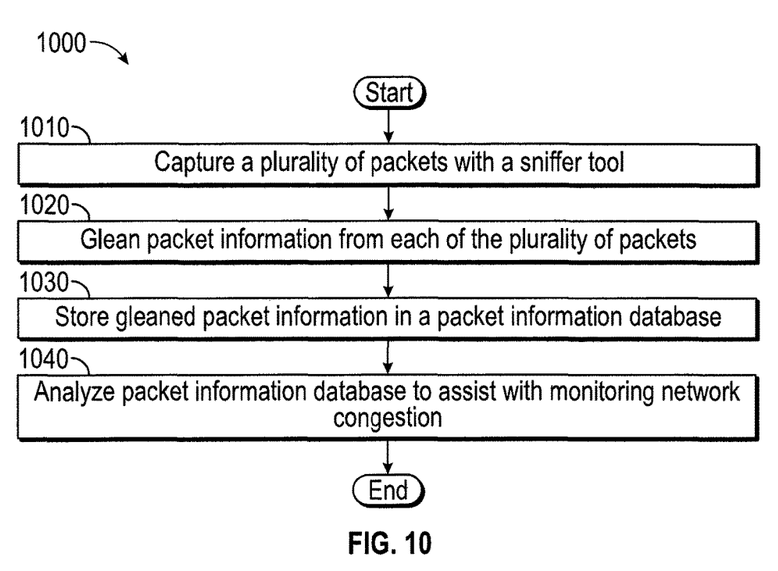
FIG. 10 is a flow chart illustrating embodiments of the present disclosure.

Having described various components of certain embodiments of network environment 100, a method 1000 implemented by one or more network devices employed on network environment 100 will now be described with reference to FIG. 10. Method 1000 may begin at step 1010 where a plurality of packets may be captured with a sniffer tool. Next, method 1000 may proceed to step 1020. At step 1020, packet information may be gleaned from each of the plurality of packets.

Method 1000 may then proceed to step 1030 where gleaned packet information may be stored in a packet information database. In some embodiments, the packet information database may comprise at least a flow table, a congestion table, and a packet table. The flow table may comprise at least one flow record about at least one data flow, wherein the at least one flow record comprises a unique flow identifier value, a flow source address, a flow destination address, a flow source port, and a flow destination port.

The congestion table comprises at least one congestion record, wherein the at least one congestion record comprises a unique congestion record identifier value, a congestion start time, and a congestion end time. The packet table may comprise at least one packet record about at least one packet, wherein the at least one packet record comprises the unique flow identifier value, a packet length value, a packet arrival time, and a packet latency value.

Method 1000 may next proceed to step 1040. At step 1040, the packet information database may be analyzed to assist with monitoring network congestion. In some embodiments, the step of analyzing the packet information database to monitor network congestion further comprises: monitoring the congestion table for new congestion records. A congestion record identifier value may then be retrieved from each new congestion record. A traffic type, a traffic rate, and a traffic time may then be determined based on the congestion record identifier value. A report containing information located based on the congestion record identifier may then be provided to interested parties.

Figure 11:
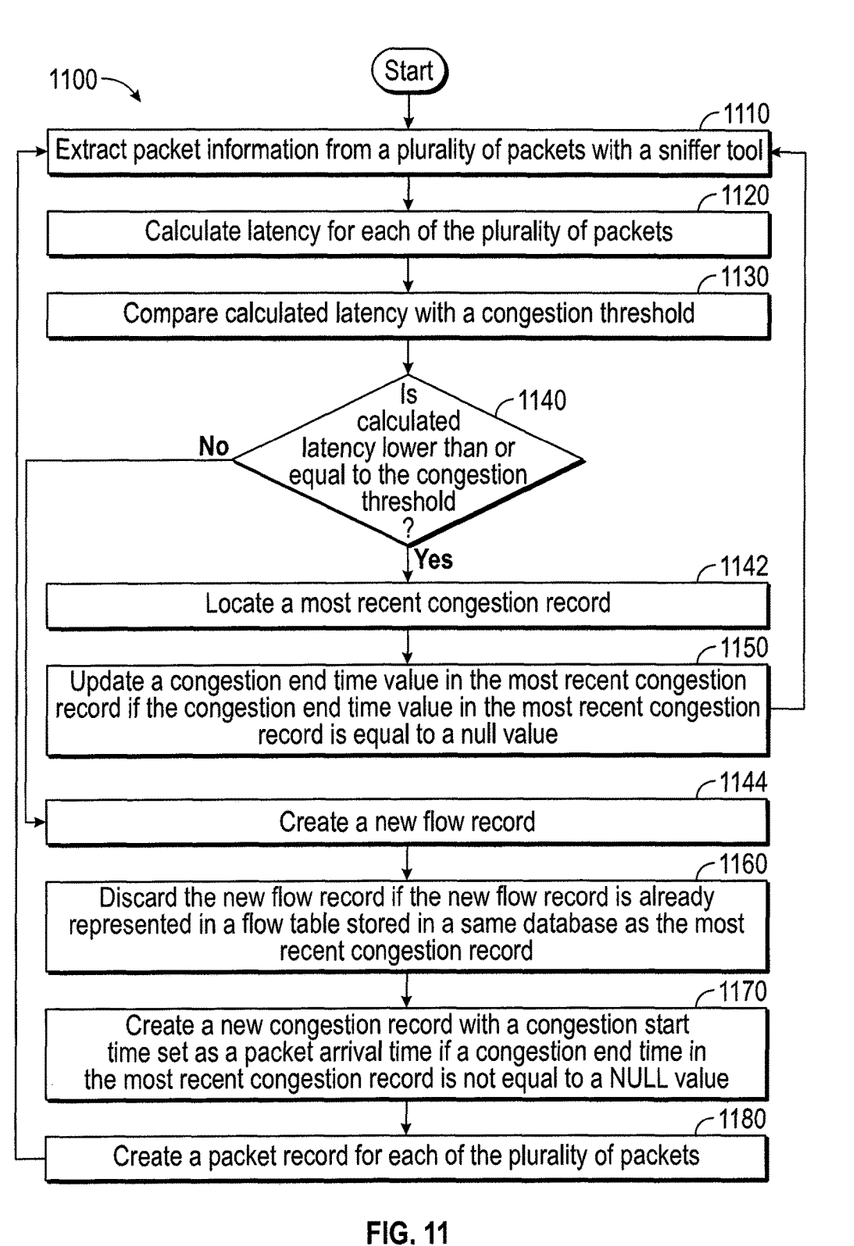
FIG. 11 is a flow chart illustrating embodiments of the present disclosure.

A method 1100 implemented by one or more network devices employed on network environment 100 will now be described with reference to FIG. 11. Method 1100 may begin at step 1110 where packet information may be extracted from a plurality of packets with a sniffer tool. In some embodiments, the extracted packet information may comprise at least a packet size, a packet arrival time, a packet departure time, a packet source address, a packet destination address, a source port number, and a destination port number. The extracted packet information may also include a packet type value.

Method 1100 may then proceed to step 1120. At step 1120, latency may be calculated for each of the plurality of packets. Next, at step 1130, the calculated latency may be compared with a congestion threshold. In some embodiments, the congestion threshold may be user definable.

Method 1100 may then proceed to step 1140 where it is determined if the calculated latency is lower than or equal to the congestion threshold. If so, method 1100 proceeds to step 1142 where a most recent congestion record is located. If the calculated latency is greater than the congestion threshold, method 1100 may proceed to step 1144 where a new flow record may be created.

From step 1142, method 1100 may proceed to step 1150. At step 1150, a congestion end time value may be updated in the most recent congestion record if the calculated latency is lower than or equal to the congestion threshold and if the congestion end time value in the most recent congestion record is equal to a NULL value. From step 1150, method 1100 may return to step 1110 to await processing the next packet.

From step 1144, method 1100 may proceed to step 1160. At step 1160 the new flow record may be discarded if the new flow record is already represented in a flow table stored in a same database as the most recent congestion record. Next, at step 1170, a new congestion record may be created with a congestion start time set as a packet arrival time if a congestion end time in the most recent congestion record is not equal to a NULL value.

Finally, method 1100 may proceed to step 1180 where a packet record may be created for each of the plurality of packets. The packet record may be inserted in a packet table located in the database.

Embodiments of the disclosure, for example, may be implemented as a computer process (method), a computing system, or as an article of manufacture, such as a non-transitory computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
    extracting packet information from a plurality of packets with a sniffer tool;
    calculating latency for each of the plurality of packets;
    comparing the calculated latency with a congestion threshold;
    locating a most recent congestion record when the calculated latency is lower than or equal to the congestion threshold; and
    updating a congestion end time value in the most recent congestion record when the calculated latency is lower than or equal to the congestion threshold and when the congestion end time value in the most recent congestion record is equal to a NULL value.

2. The method of claim 1, wherein extracting packet information comprises extracting packet information comprising at least one of the following: a packet size; a packet arrival time; a packet departure time; a packet source address; a packet destination address; a source port number; and a destination port number.

3. The method of claim 2, wherein extracting packet information comprises extracting packet information further comprising a packet type.

4. The method of claim 1, further comprising receiving the congestion threshold being user defined.

5. The method of claim 1, further comprising:
creating a packet record for each of the plurality of packets; and
inserting the packet record in a packet table located in a database.

6. A system comprising:
a memory storage; and
a processing unit coupled to the memory storage, wherein the processing unit is operative to:
extract packet information from a plurality of packets;
calculate latency for each of the plurality of packets;
compare the calculated latency with a congestion threshold;
locate a most recent congestion record when the calculated latency is lower than or equal to the congestion threshold;
update a congestion end time value in the most recent congestion record when the calculated latency is lower than or equal to the congestion threshold and when the congestion end time value in the most recent congestion record is equal to a NULL value; and
create a new flow record if the calculated latency is greater than to the congestion threshold.

7. The system of claim 6, wherein the extracted packet information comprises at least a packet size, a packet arrival time, a packet departure time, a packet source address, a packet destination address, a source port number, and a destination port number.

8. The system of claim 7, wherein the extracted packet information further comprises a packet type.

9. The system of claim 6, wherein the congestion threshold is user definable.

10. The system of claim 6, wherein the processing unit is further operative to discard the new flow record when the new flow record is already represented in a flow table stored in a same database as the most recent congestion record.

11. The system of claim 10, wherein the processing unit is further operative to:
locate a second most recent congestion record; and
create a new congestion record with a congestion start time set as a packet arrival time when a congestion end time in the most recent congestion record is not equal to a NULL value.

12. The system of claim 11, wherein the processing unit is further operative to:
create a packet record for each of the plurality of packets; and
insert the packet record in a packet table located in the database.

13. A computer-readable storage medium that stores a set of instructions which when executed perform a method executed by the set of instructions comprising:
extracting packet information from a plurality of packets with a sniffer tool;
calculating latency for each of the plurality of packets;
comparing the calculated latency with a congestion threshold;
locating a most recent congestion record when the calculated latency is lower than or equal to the congestion threshold; and
updating a congestion end time value in the most recent congestion record when the calculated latency is lower than or equal to the congestion threshold and when the congestion end time value in the most recent congestion record is equal to a NULL value.

14. The computer-readable storage medium of claim 13, wherein extracting packet information comprises extracting packet information comprising at least one of the following: a packet size; a packet arrival time; a packet departure time; a packet source address; a packet destination address; a source port number; and a destination port number.

15. The computer-readable storage medium of claim 14, wherein extracting packet information comprises extracting packet information further comprising a packet type.

16. The computer-readable storage medium of claim 13, further comprising receiving the congestion threshold being user defined.

17. The computer-readable storage medium of claim 13, further comprising:
creating a packet record for each of the plurality of packets; and
inserting the packet record in a packet table located in a database.

* * * * *